United States Patent

Huettner et al.

[11] Patent Number: 5,124,512
[45] Date of Patent: Jun. 23, 1992

[54] VEHICLE SEAT SWITCH

[75] Inventors: Heinz Huettner, Rieden; Johann Viehauser, Schwandorf, both of Fed. Rep. of Germany

[73] Assignee: Grammer AG, Amberg, Fed. Rep. of Germany

[21] Appl. No.: 596,356

[22] Filed: Oct. 12, 1990

[30] Foreign Application Priority Data

Jul. 23, 1990 [DE] Fed. Rep. of Germany ....... 4023350

[51] Int. Cl.$^5$ .............................................. H01H 3/14
[52] U.S. Cl. .................................................. 200/85 A
[58] Field of Search ................. 200/85 R, 85 A, 86 R

[56] References Cited

U.S. PATENT DOCUMENTS

| | | | |
|---|---|---|---|
| 3,703,618 | 11/1972 | Lewis | 200/85 A X |
| 3,772,644 | 11/1973 | Hanselmann et al. | 200/85 A X |
| 4,075,443 | 2/1978 | Fatur | 200/85 A |
| 4,361,741 | 11/1982 | Les Koverc et al. | 200/85 A |
| 4,678,058 | 7/1987 | Wooters | 200/85 A X |

Primary Examiner—J. R. Scott
Attorney, Agent, or Firm—Elliot M. Olstein; Susan A. Capello

[57] ABSTRACT

A seat base assembly for the operating seat of a utility vehicle comprises a base portion, a seat cushion thereon, and between the base portion and the seat cushion a switching device for switching on and off an electrical circuit of an operating device of the vehicle. A plate-like surface element is mounted to the base portion by at least one resilient connecting portion and projects away from the base portion inclinedly at an acute angle. The switching device is arranged in the area of projection of the surface element on to the base portion at a spacing from the connecting portion, whereby movement of the surface element towards the base portion under the effect of the operator's weight on the seat actuates the switching device.

7 Claims, 2 Drawing Sheets

VEHICLE SEAT SWITCH

BACKGROUND OF THE INVENTION

In some kinds of vehicles and more especially utility and commercial vehicles, farm vehicles and the like, there is a need to provide a safety arrangement to prevent a given operating device of the vehicle from being brought into operation unless certain conditions for actuation thereof are met. Such a vehicle may be for example a tractor, a mowing machine, a fork lift truck, a lawnmower or the like. In the case of such vehicles, it is often important that an operating device thereof which may be for example a mowing mechanism, an output drive shaft, a lifting assembly or the like, can be activated or brought into operation only when the person for operating the vehicle has taken up the appropriate position on the driving seat of the vehicle. Thus, in order to ensure, in relation to such vehicles, that the source of danger to the person operating the vehicle, which is constituted by the operating device thereof such as the mowing mechanism, cannot come into operation under circumstances such that the operator is likely to be endangered thereby, such a vehicle or the operating device thereof, which constitutes the danger to the operator, is prevented from being actuated unless the operator is sitting on the vehicle seat for operating same. To achieve that aim, the seat plate or seat base of the vehicle seat may comprise a base portion and a seat cushion which is disposed thereon, and, between the base portion and the seat cushion, a switching device for switching on an electrical circuit of the operating device of the vehicle, when the seat base is subjected to a certain minimum weight loading, with the electrical circuit being switched off when there is no loading applied to the seat base. However, it has been found that the switching device has a tendency to operate reliably only when the operator is in the correct sitting position on the seat, more specifically the operator has assumed such a position that he occupies at least a substantial part of the top surface of the seat cushion and thus applies a pressure, by virtue of body weight, over a considerable part of the seat surface. In the case of utility vehicles for example in the form of a mowing machine however it may frequently happen that the driver does not sit fully on the driving seat in such a way as to cover substantially the entire seating surface thereof, but only sits on the seat base at the front edge thereof so that he can more closely observe the area directly in front of the vehicle. When the operator is in that position it has been repeatedly found, with previous designs of safety arrangement for the seat base for the operator seat of a utility vehicle, that the switching device disposed between the base portion of the seat and the seat cushion does not operate correctly and the operating device of the vehicle is switched off as a result, under circumstances in which that is not required.

SUMMARY OF THE INVENTION

An object of the present invention is to provide a seat base assembly including a safety switching device which is adapted to operate reliably with the operator sitting on the seat in any position in which the operator applies a certain minimum weight to the seat base assembly.

Another object of the present invention is to provide a seat base assembly for the operating seat of a utility vehicle, including a switching arrangement for preventing untimely operation of an operating device of the vehicle, which is of a simple structure and which affords a high level of operational reliability while avoiding inappropriate interference with operation of the vehicle under circumstances such as not to justify same.

In accordance with the principles of the present invention the foregoing and other objects are achieved by a seat base assembly, for example for the operating seat of a utility or commercial vehicle, comprising a base portion and a seat cushion disposed thereon. A switching means is operatively disposed between the base portion and the seat cushion to enable an electrical circuit of an operating device of the vehicle in response to a given minimum weight loading on the seat base assembly, and to disable the electrical circuit when a given minimum weight loading is no longer applied to the seat base assembly. Disposed on the upwardly facing surface of the base portion, which is thus towards the seat cushion, is a surface element which is connected to the base portion by means of at least one elastically resilient connecting portion and which projects away from the base portion inclinedly at an acute angle. The switching means is arranged in the surface of projection of the surface element on to the base portion, spaced from the at least one resilient connecting portion.

In this specification the term surface element indicates an element which is generally of a flat configuration and of a plate-like form such as to cover an area within its confines. In a specific and preferred embodiment which is described hereinafter, the surface element comprises a generally flat plate of any suitable material.

The design configuration of the arrangement according to the present invention affords the advantage that the switching means between the base portion and the seat cushion is reliably actuated irrespective of the part of the surface of the seat cushion which is subjected to the loading of a certain minimum weight. In addition the design configuration of the invention affords the advantage that it is of a very simple nature and it is readily possible for a suitable surface element and switching means to be subsequently fitted to a seat base assembly, if required. The surface element is advantageously of dimensions which are at least approximately adapted to the dimensions of the area defined by the base portion of the seat base assembly.

In a preferred feature of the invention, secured to the surface element is a generally U-shaped loop member having first and second spaced-apart limb portions which each project beyond the surface element with a respective end portion, forming respective ones of the resilient connecting portions. The surface element may comprise an elastically yielding material, for example a plate of plastic material, a sheet metal material or the like. The U-shaped loop member preferably comprises a wire material of sufficient mechanical strength and resiliency.

In another preferred feature of the invention each of the two end portions of the generally U-shaped loop member, which project beyond the edge of the surface element, has at its end a fixing portion for securing the loop member to the base portion and, at a spacing therefrom, a support portion at which the respective limb of the loop member bears against the base portion, for supporting the loop member. A loop member of that kind is simple to produce and can be easily and quickly secured to the base portion while at the same time affording the advantage that the surface element which is combined with the loop member to form a self-contained unit projects resiliently away from the base portion at a defined acute angle. The resilient support for the loop member and therewith the surface element is afforded by the part of each limb portion of the loop member, which is defined on the one hand by the corresponding fixing portion at the end of the respective limb portion of the loop member, and on the other hand by the support portion which is spaced therefrom.

In another preferred feature, the U-shaped loop member may be secured with its two spaced-apart limb portions to fixing plates or lugs on the surface element. The fixing plates or lugs are preferably formed integrally with and extend away from the surface element at the appropriate positions thereon, which can be achieved by virtue of the surface element having cuts formed therein of generally U-shaped configuration, thereby to define the corresponding fixing lug or plate.

In order to ensure reliability of actuation of the switching means disposed between the base portion and the seat cushion of the seat base assembly according to the invention, when the seat cushion is subjected to a possibly limited loading thereon, over the surface area thereof, it is advantageous for the switching means to be actuable by an elongate arcuate actuating element which is disposed on the base portion of the seat base assembly, in such a way as to be engaged by the surface element within the area of projection of the surface element on to the base portion. In that arrangement, the switching means may be combined with the arcuate actuating element to form a unit or component, as is the case for example when the switching means is a switch device which has an integrated arcuate actuating member forming part thereof. Alternatively however the switching means may also comprise a microswitch with which an actuating arcuate element co-operates. An end portion of the arcuate actuating element bears against the microswitch or more specifically the operating member thereof while the second end portion of the arcuate actuating member is secured to the base portion or possibly the seat cushion of the seat base assembly. In any case, with those two forms of switching arrangement, when the seat cushion is subjected to a weight thereon, the arcuate actuating element is also subjected to a mechanical loading in such a way that the switching means associated therewith is actuated and accordingly an electrical circuit connected to the switching means, forming part of an operating device of the vehicle, is enabled or switched on when the seat base assembly is subjected to the loading of a certain minimum weight. In that situation, as indicated above, there is the advantage that the switching means is reliably actuated, irrespective of whether a weight is applied to the surface of the seat base assembly over the entire area thereof, or only at a limited portion thereof, provided that the weight applied is of a certain minimum value.

Further objects, features and advantages of the present invention will become apparent from the following description of a preferred embodiment thereof.

DESCRIPTION OF THE PREFERRED EMBODIMENT

Figure 1:
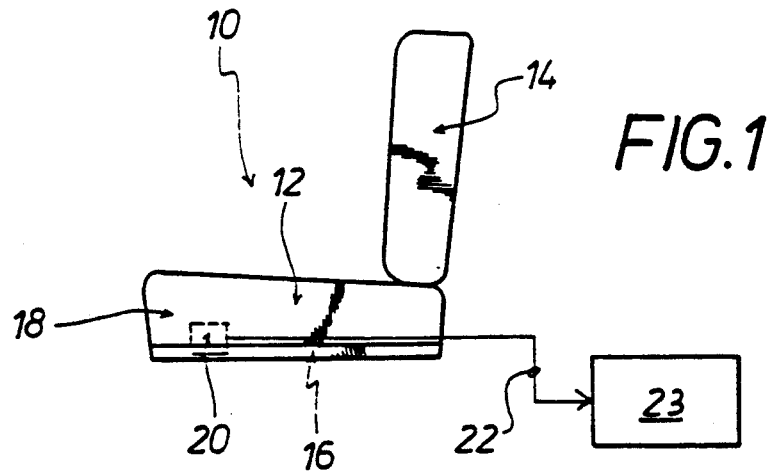
FIG. 1 is a diagrammatic view of an operating seat of a utility vehicle in conjunction with an operating device of the vehicle, indicated in the form of a block.

Referring firstly to FIG. 1, shown therein is an operating seat 10 of a commercial or utility vehicle or the like, comprising a seat base assembly 12 and a backrest portion 14. The seat base assembly 12 comprises a base portion 16 and a seat cushion 18 which is supported on the base portion 16. Disposed between the base portion 16 and the seat cushion 18 is a switching means 20 which is shown in broken lines in the form of a block in FIG. 1 and which is electrically conductively connected by way of an electrical circuit 22 which is indicated by a line with an arrowhead in FIG. 1, to an operating device 23, which is shown in the form of a block, of the vehicle (not shown). The operating device 23 can be switched on only when an operator has taken up the operating position on the seat 10 so that the seat base assembly 12 is subjected to the loading of a given minimum weight.

Figure 2:
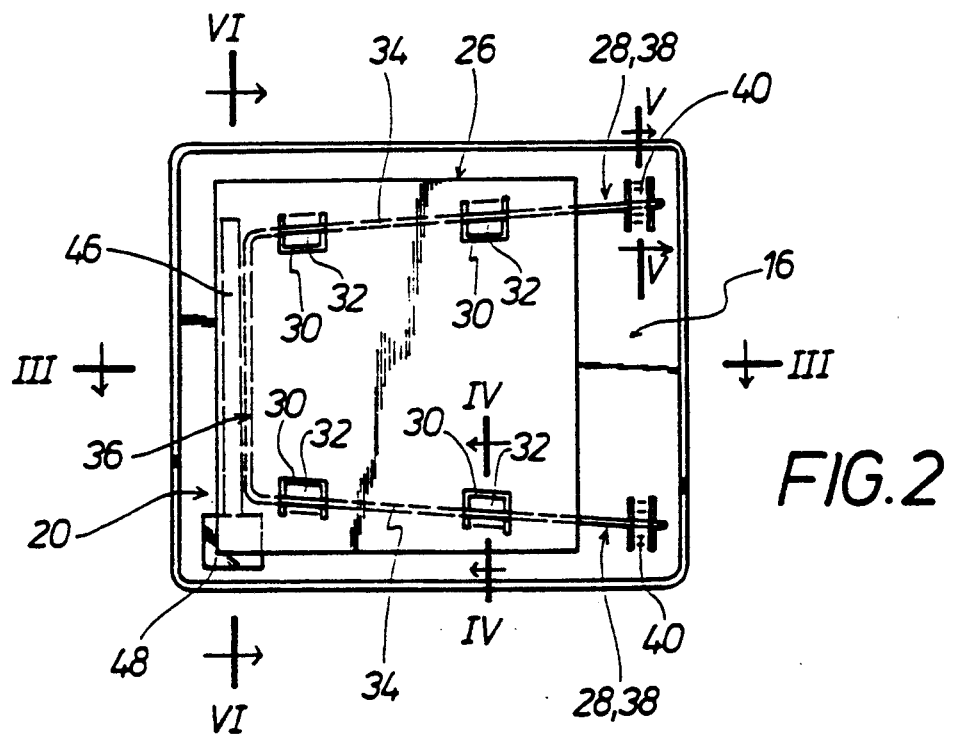
FIG. 2 is a view from above of the base portion of the FIG. 1 seat, showing the surface element and the switching means thereof.
Figure 3:
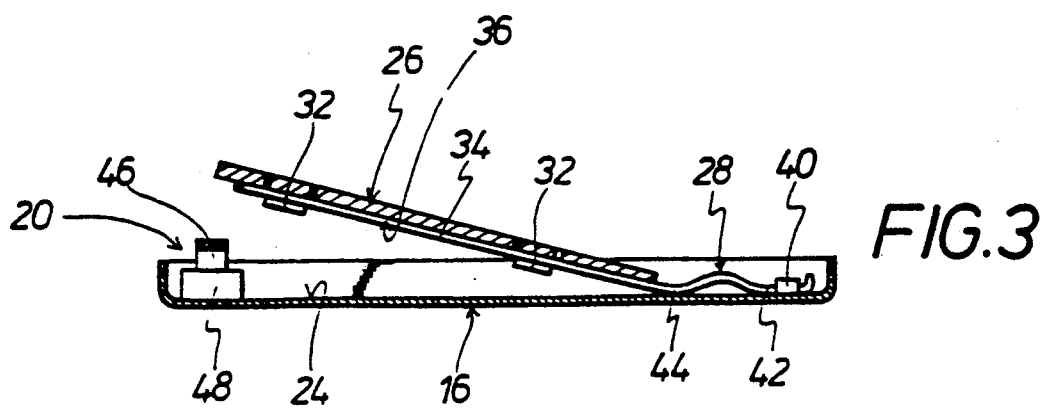
FIG. 3 is a view in section taken along line III—III in FIG. 2.

Referring now to FIGS. 2 and 3, shown therein is the base portion 16 of the seat 10, together with a surface element 26 which is disposed at the upwardly facing surface 24 of the base portion 16, which thus faces towards the bottom of the seat cushion which is indicated at 18 in FIG. 1 but which is omitted from FIGS. 2 and 3 for the sake of clarity. The surface element 26 is of a generally plate-like configuration, of any suitable material, as can be seen for example from FIG. 2. The surface element 26 is secured to the base portion 16 by means of elastically resilient connecting portions 28, with the surface element 26 projecting away from the base portion 16 and enclosing an acute angle therewith, as can be particularly clearly seen from FIG. 3.

It will be seen from FIG. 2 that the surface element 26 is of dimensions which are at least approximately adapted to the dimensions of the base portion 16 in terms of the surface area thereof, or which are somewhat smaller than the dimensions of the base portion 16.

Figure 4:
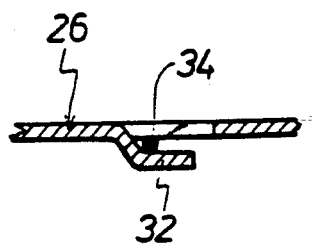
FIG. 4 is a view in section taken along line IV—IV in FIG. 2.
Figure 5:
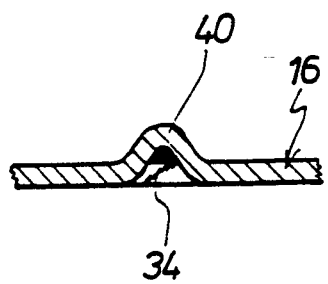
FIG. 5 is a view in section taken along line V—V in FIG. 2.

The surface element 26 has cuts 30 therethrough, of generally U-shaped configuration, thereby defining fixing plate portions or lugs 32. It will be seen from FIG. 4 that the lugs 32 are bent downwardly out of the plane of the surface element 26 and serve to secure in position respective ones of two limb portions 34 which are disposed in spaced-apart and approximately parallel relationship, of a generally U-shaped loop member indicated generally at 36 for example in FIG. 2. The two limb portions 34 project beyond the edge of the surface element 26 with respective end portions as indicated at 38. The end portions 38 serve on the one hand to provide the above-mentioned resilient connecting portions 28 while on the other hand they also serve to secure the loop member 36 to the base portion 16 of the seat base assembly. For the latter purpose, the base portion 16 is provided with generally eye-shaped fixing portions 40 which can be clearly seen in section in FIG. 5. Each fixing portion 40 projects upwardly out of the surface of the base portion 16 so that it is easily possible for the corresponding limb portion 34 to be fixed in position between the fixing lugs 32 and the surface element 26, as shown in FIG. 4, and between the base portion 16 and the fixing portion 40, as shown in FIG. 5.

It will also be clearly apparent from FIG. 3 that each resilient connecting portion 28 of the U-shaped loop member 36 is delimited by a fixing portion 42 at the end of the respective limb portion 34, and on the other hand, by a support portion 44 which is spaced therefrom. The end fixing portion 42 of each limb portion 34 is held firmly in position between the corresponding fixing portion 40 and the base portion 16 while the corresponding support portion 44 only bears against the upwardly facing surface 24 of the base portion 16.

Figure 6:
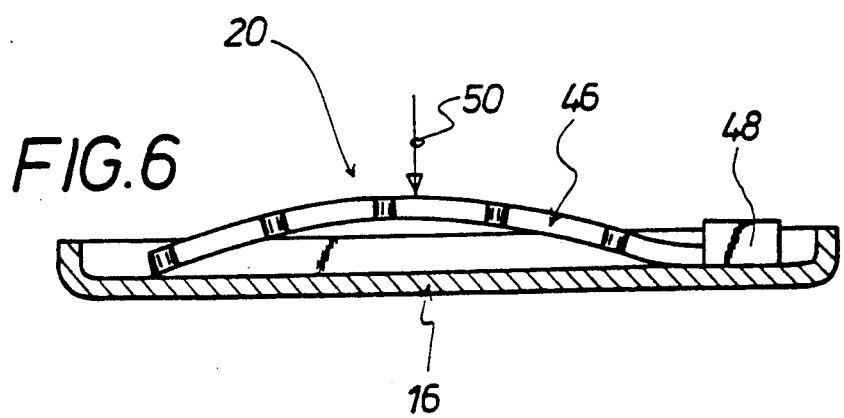
FIG. 6 is a view in section taken along line VI—VI in FIG. 2.

FIGS. 2 and 3 show that disposed at a spacing from the resilient connecting portions 28 of the loop member 36 is a switching means 20 which is indicated by a block in broken line in FIG. 1. The switching means 20 is disposed on the upwardly facing surface 24 of the base portion 16. FIG. 6 shows an embodiment of the switching means 20, comprising a switching structure including an arcuate actuating element 46 and an electrical switch 48 which is operatively connected to the arcuate actuating element 46.

With the FIG. 6 switching structure, when the arcuate actuating element 46 is subjected to a loading by virtue of the seat cushion 18 in FIG. 1 being loaded with a given minimum weight, as indicated in FIG. 6 by the downwardly pointing arrow 50, the arcuate actuating element 46 is urged towards the base portion 16 whereby the element 46 actuates the electrical switch 48 in a manner which will be clearly apparent from the drawing.

Figure 7:
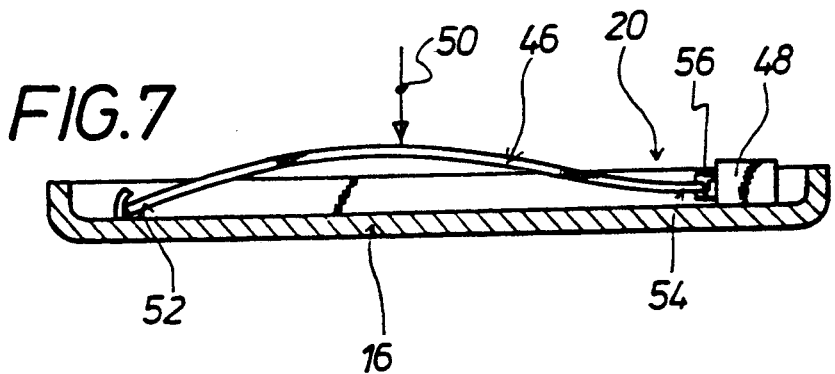
FIG. 7 is a view similar to that shown in FIG. 6 of another embodiment of the switching means with the associated arcuate actuating element.

Reference will now be made to FIG. 7 showing a switching means which differs from that shown in FIG. 6 more specifically in that the electrical switch 48 is a per se known microswitch and the arcuate actuating element 46 is in the form of a spring element. The spring element is arranged with its one end portion 52 stationary with respect to the base portion 16, while its second end portion 54 bears against the microswitch 48 and more specifically the switching contact arrangement 56 thereof. When the seat cushion 18 shown in FIG. 1 is subjected to the loading of a given minimum weight, the illustrated switching structure also involves a corresponding mechanical loading being applied to the arcuate actuating element 46 as a result of the surface element 26 being pressed thereagainst, as indicated by the arrow 50 in FIG. 7, and that consequently results in actuation of the switching contact arrangement 56 of the microswitch 48. It will be seen therefore that when the switch is actuated the electrical circuit indicated at 22 in FIG. 1 is enabled to permit the operating device 23 of the vehicle to be brought into operation, whereas the electrical circuit 22 will be disabled when there is no minimum weight loading applied to the seat base assembly 12.

It will further be noted that the switching means 20 is arranged in such a position that it can be satisfactorily engaged by the surface element 26, at any suitable part thereof, and is thus disposed in the area of projection of the surface element 26 on to the base portion 16, remote or at a spacing from at least one resilient connecting portion 28. It will be seen therefore that positions of the switching means 20 other than that illustrated in the embodiment described above are also possible.

It will be appreciated generally that the above-described embodiment of the invention has been set forth solely by way of example and illustration of the principles thereof and that various other modifications and alterations may be made therein without thereby departing from the spirit and scope of the invention.

We claim:

1. An improved actuator assembly for completing an electrical circuit of a vehicle, the actuator being operated by an operator's seat of the vehicle having a base and seat supported on the base, wherein the improvement comprises:
    a planar member located above the base and below the seat;
    a resilient connecting means for pivotally mounting a rear edge of the plate to the base, for normally maintaining the plate at a first location away from the base and for rotating the plate to a second location adjacent to the base upon application to the seat of a predetermining minimum load;
    a switching means located between the base and the seat, for completing the electrical circuit in response to the planar member being in the second location, the switching means being located so that it is contacted by a front edge of the planar member when the planar member is in the second location.

2. An improved actuator assembly as in claim 1, wherein said switching means comprises:
    an arcuate, flexible element which is mounted to the switching means at one end and is in contact with the base at the other end, the arcuate element being straightened and extended as a result of the application of the predetermined minimum load to the seat, the straightening and extending of the arcuate element causing completion of the electrical circuit by the switching means.

3. An improved actuator assembly as in claim 2, wherein said switch is a microswitch.

4. An improved actuator assembly as in claim 2, wherein said other end of the arcuate element is attached to the base.

5. An improved actuator assembly as in claim 4, wherein said arcuate actuating element is a spring element.

6. An improved actuator assembly as in claim 4, wherein said switch is a microswitch.

7. An improved actuator assembly as in claim 1, wherein said resilient connecting means comprises:
    a U-shaped member having limb portions which are attached to and extend beyond the rear edge of the planar member and the end of each limb portion being attached to the base; and
    a pivot point formed where the limb portions extend beyond the plate and contact the base, the limb portions between the pivot point and the end of each limb portion having an arcuate shape providing a resilient connecting portion.

* * * * *